United States Patent Office 3,297,525
Patented Jan. 10, 1967

3,297,525
FUNGICIDAL COMPOSITIONS COMPRISING SALICYLATES OF 8 HYDROXY QUINOLINE CARBOXYLIC ESTERS
Nathaniel Grier, Englewood, N.J., assignor, by mesne assignments, to Merck & Co., Inc., Rahway, N.J., a corporation of New Jersey
No Drawing. Filed Oct. 19, 1962, Ser. No. 231,813
22 Claims. (Cl. 167—58)

The present application is a continuation-in-part of my copending application Serial No. 758,555, filed September 2, 1958.

The present invention relates to the manufacture of new compounds and compositions containing the same characterized by a high antifungal and antibacterial activity and suitable for clinical and industrial use.

It is the general object of the invention to provide improved compounds and compositions possessing powerful antimicrobial activity and capable of use both clinically for the treatment of fungal infections, as against the organisms causing dermatophytosis pedis ("athlete's foot"), and industrially, as in the mildewproofing of paints and other coating compositions and organic films of various kinds subject to fungal action, impregnating compositions, and for disinfection generally.

It is a particular object of the invention to provide antifungal agents which in clinical use are substantially free from irritation, are rapid and reliable in their action, and promote rapid healing of diseased areas of long standing. Other objects and advantages of the invention will become apparent from the detailed description hereinafter.

Briefly described, the invention relates to antifungal and antibacterial agents obtained by the reaction of esters of 8-hydroxyquinolines with salicylic acids, the products being in the nature of addition compounds or "salts."

It is well known that 8-hydroxyquinolines form addition compounds or amine salts with a wide variety of inorganic and organic acids. Included among the latter are malonic, maleic, succinic, citric, tartaric, phthalic, salicylic, and beta-resorcylic acids. Also, many esters of 8-hydroxyquinolines have been synthesized. However, although some of these esters have been used to form salts with inorganic and certain sulfonic acids, they can not be converted into the salts of the common organic acids. Thus, the benzoic ester of 8-hydroxyquinoline has been synthesized using known procedures, but attempts by me to prepare salts of this ester with such acids as malonic, maleic, citric, tartaric and phthalic were unsuccessful. In each case there was no reaction of the components when used in either equivalent or molar excess proportions in homogeneous solutions in various solvents, e.g., aqueous alcohols, anhydrous alcohols, ether, benzene, chloroform, etc. In every instance the 8-quinolinyl benzoate base was recovered in almost quantitative yield after each trial. Under the same conditions, 8-hydroxyquinoline itself readily forms salts with these acids, the products being well defined and isolatable. However, 8-quinolinylbenzoate failed to form a salt even with so acidic a substance as o-sulfobenzimide ($K_A=2.5\times10^{-2}$). Attempts to combine phthalic acid with 8-quinolinylbenzoate yielded nothing but the original reactants.

Similar results were obtained with β-resorcylic acid (2,4-dihydroxybenzoic acid) and gentisic acid (2,5-dihydroxybenzoic acid). Although these two latter acids form salts readily with 8-hydroxylquinoline, they failed to react with 8-quinolinylbenzoate.

It was accordingly most surprising to discover that when 8-quinolinylbenzoate (and also other esters, and of further substituted quinolines, as described below) was reacted with o-hydroxybenzoic acid (salicylic acid) a well-defined product resulted in excellent yield and of a composition corresponding to one molecule of salicylic acid for each molecule of 8-quinolinylbenzoate. This was all the more unexpected as under the same conditions phthalic acid, which is the corresponding o-carboxylic benzoic acid, and is comparable to salicylic acid in acid strength $$(K_{A_1}=1.26\times10^{-3} \text{ vs. } K_{A_1}=1.06\times10^{-3})$$

failed to form a salt.

A possible explanation for the unusual and unexpected results obtained, although it is to be understood that I am not committed to such theory, may be in terms of a twofold joining of the reactants, on the one hand, by typical salt formation between the carboxylic acid and the basis heterocyclic nitrogen together with intermolecular hydrogen bonding of the ortho hydroxyl hydrogen with the carbonyl of the ester carboxylate, on the other, to give a stable compound, viz:

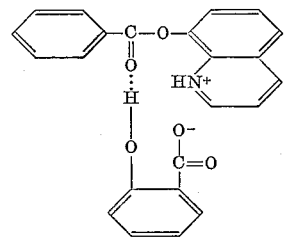

Mere hydrogen bonding can not bring about a stable linkage as shown by the failure of the attempt to effect a reaction between 8-quinolinylbenzoate with ortho nitrophenol. No addition took place under a variety of experimental conditions. The highly specific properties needed for reaction were demonstrated by the failure of ethylene diamine tetra-acetic acid to give an isolatable reaction product with 8-quinolinyl benzoate when used in equimolecular proportions employing solutions prepared from formamide and water. Even thiosalicylic acid, i.e., ortho mercaptobenzoic acid, was recovered unchanged when equivalent proportions or even excess amounts were mixed in a variety of solvents with the above-named ester. Although a strong similarity exists between salicylic acid and its sulfur analog, it is possible that the mercapto hydrogen is too tightly held by the sulfur, thus preventing intermolecular hydrogen bonding. Salicylic acid substituted with groups containing additional acidic hydrogen atoms, e.g. β-resorcylic and gentisic acids, showed no reactivity, and in these instances it is possible that the available acidic hydrogen of the hydroxyl distant from the salt-forming carboxyl preferentially interfered with hydrogen bonding of the ortho hydroxyl hydrogen.

The compounds of the present invention are accordingly comprised within the following general formula:

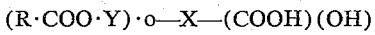

wherein Y is the 8-quinolinyl radical or a substituted 8-quinolinyl radical while R is the residue of a monobasic or dibasic aliphatic, or also of an aromatic or heterocyclic acid, and X is a phenyl radical free from substituents containing additional acidic hydrogen atoms. Thus R may be an alkyl or substituted alkyl group having up to 18 carbon atoms, and may also be aryl, aralkyl, aralkylene, furyl, and the like. By way of example, the salts of the invention include the salicylic acid salts of 8-quinolinyl acetate, propionate, butyrate, t-butyl acetate, laurate, palmitate, stearate, cyclohexyl and cyclopentyl acetate and propionate, benzoate, cinnamate, phenyl acetate and propionate, veratrate, furoate, and also the di-salicylic acid salts of di-8-quinolinyl phthalate and iso-phthalate, di-8-quinolinyl malonate and di-8-quinolinyl succinate.

For example, a new ester, di-8-quinolinyl phthalate, was prepared from phthalyl chloride and 8-hydroxyquinoline in pyridine. Even when the phthalyl chloride was used in large excess and the 8-hydroxyquinoline added gradually to it, the only product obtained was the di-ester of 8-hydroxyquinoline and phthalic acid. This ester upon reaction with salicylic acid yielded a product which analyzed correctly for the composition $$C_{26}H_{16}O_4N_2 \cdot 2C_7H_6O_3$$

molecular weight 696, corresponding to the structural formula

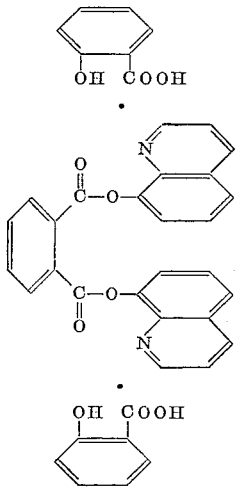

The compound is thus composed of one molecule of di-8-quinolinyl phthalate and 2 molecules of salicylic acid. Attempts to prepare the product corresponding to one molecule of di-8-quinolinyl phthalate and one molecule of salicylic acid by the use of an excess of the di-8-quinolinyl ester were unsuccessful; only the above product was obtained.

This reaction was extended to a variety of esters of 8-hydroxyquinoline. For example, 8-quinolinyl cinnamate, phenylacetate, butyrate, laurate, and palmitate formed isolatatable, well-defined products when reacted with salicylic acid.

The high degree of anti-fungal effectiveness and substantial freedom from irritation of the salicylate salts of the present invention (as described more fully hereinbelow) are also most surprising in view of the fact that salicylic acid, both alone and mixed, as in Whitfield's Ointment, has practically no antifungal power, its action being "due chiefly to its keratolytic effect, and it is highly irritating" ("Antiseptics, Disinfectants, Fungicides and Sterilization," edited by G. F. Reddish, Lea & Febiger, Philadelphia, 1954, pp. 557–8).

The quinoline ester can be nuclearly further substituted by one or more groups free of acidic hydrogens, like halogen (fluorine, chlorine, bromine and iodine), lower alkyls (up to eight carbon atoms), nitro, and the like. Thus in place of 8-hydroxyquinoline (in the formation of the ester) there may be employed 5-chloro-7-iodo-8-hydroxyquinoline, 5,7,-diiodo-8-hydroxyquinoline, and 5, 7-dibromo-8-hydroxyquinoline.

The salicylate salts, including the salt of salicylic acid itself, of the esters, such as the benzoic acid ester, of these dihalogenated 8-hydroxy-quinolines, are more effective and less irritating in the treatment of microbially induced pathologic conditions than the known diiodo-8-hydroxyquinoline.

The quinoline nucleus may also be both halogenated and alkylated, examples of such compounds being the salicylic acid salts of the benzoic acid esters of 3-methyl-5-chloro-7-iodo-8-hydroxyquinoline and 4-methyl-5,7-dibromo-8-hydroxyquinoline, and the like.

The phenyl nucleus of the salicylic acid can be similarly further substituted by groups free from acidic hydrogen, including lower alkyl, cyclohexyl, phenyl, halogen (fluorine, chlorine and bromine, but preferably iodine), nitro, and the like. Examples of such salicylic acids are:

5-chlorosalicylic acid, 3,5-diiodosalicylic acid, 4-methyl salicylic acid, 3-hexyl and 3-cyclohexyl salicylic acid, 3-phenylsalicylic acid, and 3,5-dinitrosalicylic acid. These acids can be used to form salts with any of the esters of 8-hydroxyquinolines named herein.

Both the quinoline and salicylic nuclei of any salt can be further substituted as above described. Moreover, the alkyl, aryl or heterocyclic radicals of the ester groups can be substituted by halogen or nitro in the case of the alkyl radicals, or by halogen, lower alkyl or nitro in the case of cyclohexyl, aromatic or heterocyclic carboxylic acids. Examples of these are the salicylates (unsubstituted or substituted as above described) of p-chloro cyclohexyl carboxylic acid ester of 8-hydroxyquinoline, the p-nitrobenzoic acid ester, the alpha-nitrofuroic acid ester, the o-ethyl and o-chloro-benzoic acid ester, the 2-chloropropionic acid ester, and the like.

The compounds of the invention are accordingly embraced by the following general formula:

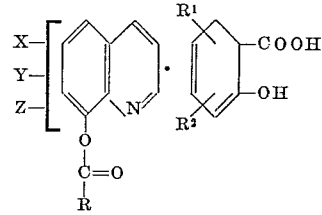

wherein

R is the residue of an organic monocarboxylic acid, or of an organic polycarboxylic acid whose other carboxyl group or groups (as in the case of citric acid) are esterified with an 8-hydroxyquinoline similarly salified with a salicylic acid, such residue being further substituted or not, as with halogen, nitro, lower alkyl and other groups free of acidic hydrogen;

$R^1$ and $R^2$ are hydrogen, halogen (any of the four, but preferably iodine), lower alkyl (e.g., 3 and/or 5-methyl), nitro, or other group devoid of acidic hydrogen;

X is hydrogen or lower alkyl;

Y and Z are hydrogen, halogen, nitro, or other groups having no acidic hydrogen.

The following examples illustrate detailed procedures for the preparation of the compounds of the invention, but are not to be understood as indicating the scope thereof.

EXAMPLE 1

*8-quinolinyl benzoate-salicyllic acid salt*

124 grams 8-quinolinyl benzoate (M.P. 123–124° C.) and 70 gms. salicylic acid were dissolved in 1200 ml. 99% isopropyl alcohol by heating and stirring. On slow cooling thick colorless needles gradually formed. After 12 hours the product was removed by suction filtration, washed with 99% isopropyl alcohol, and air-dried. The yield was 130 grams of a colorless product.

For analysis a sample was recrystallized from 99% isopropyl alcohol, M.P. 135.6–136.6° (Anschütz thermometer). Carbon, hydrogen and nitrogen values were in excellent agreement for the composition, $$C_{16}H_{11}O_2N \cdot C_7H_6O_3$$

mol. wt. 387.

The specificity of this reaction in terms of the acid used is illustrated by the following:

6.2 gms. 8-quinolinyl benzoate and 2.9 gms. maleic acid were dissolved by warming in 65 ml. 99% isopropyl alcohol to give a clear solution. On slow cooling, large colorless prisms formed; after standing, these were recovered by suction filtration, washed with 99% isopropyl alcohol and dried. The first crop yielded 5.04 gms., M.P. 123–124° C. A mixed melting point and analysis showed this product to be unreacted 8-quinolinyl benzoate. Concentration of the filtrate yielded the remainder of the 8-quinolinyl benzoate in an uncombined state.

This experiment was repeated using the same ester with different organic carboxylic acids, e.g., phthalic, malonic, succinic, tartaric, thiosalicylic, beta-resorcylic, gentisic and others. The solvents used were chosen on the basis of providing mutual solubility, secondary alcohols being preferred over primary to avoid ester exchange. In all these instances the 8-quinolinyl benzoate was recovered uncombined in high yield. o-Sulfobenzimide dissolved in 99% isopropyl alcohol together with an equivalent amount of 8-quinolinyl benzoate also failed to react.

EXAMPLE 2

*Di-8-quinolinylphthalate-di-salicylic acid salt*

(a) *Di-8-quinolinyl phthalate.*—30 gms. (0.21 mole) 8-hydroxyquinoline were dissolved in 120 gms. anhydrous pyridine in a 500 ml. 3-neck round bottom flask equipped with a thermometer, dropping funnel, agitator, cooling bath, and vented to the atmosphere through a calcium chloride drying tube. The internal temperature was maintained at 10 to 15° C. and over a period of 1½ hours there were then added dropwise 25 gms. (0.12 mole) phthalyl chloride. After complete addition, the mixture was agitated an additional 1½ hours at 15 to 20° C. It was then poured into 500 ml. water, stirred thoroughly and allowed to stand overnight. The small excess of phthalyl chloride which remained was thus converted to phthalic acid, and this remained in solution as the pyridine salt. The di-8-quinolinyl phthalate was removed by suction filtration, washed well with water, and air-dried at room temperature. A yield of 35 gms. 80% was obtained. The product was crystallized from benzene (35 gms. in 400 ml.) to give large, colorless prisms, melting point 178–180° C. to a clear colorless melt. Analysis for carbon, hydrogen and nitrogen confirmed the composition $C_{26}H_{16}O_4N_2$, molecular weight 420.

Di-8-quinolinyl phthalate is colorless, odorless, poorly soluble in water, and slightly soluble in methyl or 99% isopropyl alcohol. On boiling a suspension of the product in water, no color is observed. Testing of the liquor with ferric chloride showed that no 8-hydroxyquinoline had been liberated. However, di-8-quinolinyl phthalate is readily soluble in dilute aqueous hydrochloric acid and on heating, rapid hydrolysis results, the thus-formed 8-hydroxyquinoline hydrochloride causing a strong yellow coloration. In water made alkaline by the addition of monoethanolamine, the di-8-quinolinyl phthalate was stable even at the boiling point.

The use of the above preparative procedure gives rise to only one product, di-8-quinolinyl phthalate, even under conditions that should favor the formation of mono-8-quinolinyl acid phthalate. In a similar experimental set-up there were placed 250 gms. anhydrous pyridine into the reaction flask. After cooling to 15° C., 50 gms. (0.25 mole) phthalyl chloride were added slowly. Next, over a ½ hr. period, a solution of 20 gms. (0.14 mole) 8-hydroxyquinoline dissolved in 50 gms. anhydrous pyridine was added. The reaction mixture was stirred an additional two hours at 15° C., quenched in 1 liter water and processed as before. A white crystalline powder was obtained, 28 gms., which on recrystallization from benzene had a melting point of 178–180° C. A mixed melting point with di-8-quinolinyl phthalate was unchanged. The theoretical yield for this product is 29 gms.

(b) *Di-8-quinolinylphthalate-di-salicylic acid salt.*— 8.4 gms. (0.02 mole) di-8-quinolinyl phthalate were dissolved in 150 ml. boiling benzene. To this there were added 5.5 gms. (0.04 mole) salicylic acid. A clear solution resulted. On cooling and scratching a white crystalline precipitate was obtained. After standing 2 hours, the product was filtered, washed with benzene and air-dried. Yield 12 gms. of colorless crystals. This was recrystallized from benzene, M.P. 140–142° C. (Anschütz therm.). Analysis for carbon, hydrogen and nitrogen gave excellent agreement for $C_{26}H_{16}O_4N_2 \cdot 2C_7H_6O_3$, molecular weight 696.

Attempts to prepare the mono salicylic acid reaction product with the di-8-quinolinyl phthalate by the use of equi-molar proportions were unsuccessful, the di-salicylic acid-di-8-quinolinyl phthalate being the only isolatable reaction product.

EXAMPLE 3

*8-quinolinyl butyrate-salicylic acid salt*

2.76 gms. (0.02 mole) salicylic acid and 4.3 gms. (0.02 mole) 8-quinolinyl butyrate were dissolved in 100 ml. petroleum ether (boiling point range 30–60° C.). On cooling to room temperature, no precipitate formed. However, on refrigeration at 0° C. long, colorless needles result; these were removed by suction filtration, washed with cold petroleum ether, and air-dried to give 3.0 gms. of product. Recrystallization from petroleum ether gave a colorless crystalline product which melted at 77.0–77.5° C. (Anschütz therm.) and analyzed correctly for $C_{13}H_{13}O_2N \cdot C_7H_6O_3$.

EXAMPLE 4

*8-quinolinyl palmitate-salicylic acid salt*

3.8 gms. (0.01 mole) 8-quinolinyl palmitate and 1.4 gms. (0.01 mole) salicylic acid were dissolved in 50 ml. 99% isopropyl alcohol by warming. On cooling, no product precipitated. The volume was reduced to 25 ml. under vacuum, and on cooling, long colorless needles formed. These were removed by suction filtration, washed with a small volume of cold 99% isopropyl alcohol, and air-dried. The first crop of product was 3.4 gms. For analysis this was recrystallized from 99% isopropyl alcohol to give long, colorless needles, melting point 66.5 to 67.2° (Anschütz therm. of the composition $C_{25}H_{37}O_2N \cdot C_7H_6O_3$, molecular weight 521.

EXAMPLE 5

*3-methyl-8-quinolinyl benzoate-salicylic acid salt*

(a) *3-methyl - 8-quinolinyl benzoate.*—Ten gms. 3-methyl-8-hydroxyquinoline and 20 gms. benzoyl chloride were mixed together and heated in an oil bath to an internal temperature of 170° C. for 8 hours. The molten reaction mass was poured into a dish, allowed to solidify, and then mixed with 100 ml. water for 4 hours. The product was removed by suction filtration, washed with a small volume of 0.5 N HCl solution and air-dried. A yield of 11.0 gms. 3-methyl-8-quinolinyl benzoate was obtained. For analysis a sample was recrystallized from diethyl ether to give thick colorless prisms, M.P. 108.5–109° C. (Anschütz thermometer). Analysis for carbon, hydrogen, and nitrogen gave excellent checks for $C_{17}H_{13}O_2N$, mol. wt. 263.

(b) *3-methyl - 8-quinolinyl benzoate-salicylic acid salt.*—0.66 gm. salicylic acid was added to a clear solution of 1.20 gms. 3-methyl-8-quinolinyl benzoate in 30 ml. benzene. On slow cooling, colorless crystals formed. These were removed by suction filtration, washed with cold benzene, and air-dried. For analysis a sample was recrystallized from benzene, M.P. 140–141° C. (Anschütz therm.). Analysis agreed well for $C_{24}H_{19}O_5N$, mol. wt. 401.

EXAMPLE 6

*4-methyl-8-quinolinyl benzoate-salicylic acid salt*

(a) *4-methyl - 8-quinolinyl benzoate.*—Ten gms. 4-methyl-8-hydroxyquinoline were dissolved in 40 gms. anhydrous pyridine. This was cooled to 10° C. and with good agitation then were added 10 gms. benzoyl chloride over a 1½ hr. period. After complete addition the temperature was then maintained at 12–14° C. for an additional hour. The solution was poured into 200 ml. H₂O, stirred for ½ hr., the product suction-filtered, water-washed and air-dried. The yield was 15.5 gms. 13.5 gms. were dissolved in 650 ml. mineral spirits with heating, filtered free of a slight residue and allowed to crystallize with slow cooling. Colorless crystals of 4-methyl-8-quinolinyl benzoate were obtained. For analysis a sample was recrystallized from mineral spirits, M.P. 123–124.2° C. (Anschütz thermometer). A mixed melting point with 4-methyl-8-hydroxyquinoline showed a large depression, as did also the mixed melting point with benzoic acid. Analysis confirmed the composition $C_{17}H_{13}O_2N$, mol. wt. 263.

(b) *4-methyl - 8-quinolinyl benzoate-salicylic acid salt.*—Two gms. of 4-methyl-8-quinolinyl benzoate and 1.1 gms. salicylic acid were dissolved in 120 ml. mineral spirits with heating. On slow cooling, a crystalline product resulted; this was separated using suction-filtration, washed with a small volume of mineral spirits and air-dried to give a yield of 2.9 gms. A sample for analysis was obtained by recrystallization from mineral spirits to give a practically colorless, crystalline material, M.P. 107.5–109° C. (Anschütz thermometer), the analysis agreeing well with the composition $C_{24}H_{19}O_5N$, mol. wt. 401.

EXAMPLE 7

*8-quinolinyl benzoate-3,5-dinitrosalicylic acid salt*

2.46 gms. (0.01 mole) 3,5-dinitrosalicylic acid were dissolved in 25 ml. 99% isopropyl alcohol at room temperature. The solution was added rapidly with stirring to a hot solution of 2.49 gms. (0.01 mole) 8-quinolinyl benzoate in 60 ml. 99% isopropyl alcohol. There was immediate precipitation of a yellow crystalline product. After cooling it was removed by suction filtration, washed with 99% isopropyl alcohol and air-dried. Yield 4.7 gms. of yellow needles.

For analysis 1 gram was recrystallized from 350 ml. 99% isopropyl alcohol to give thin long yellow needles, M.P. (Anschütz therm.) 198–200° C. to a yellow liquid. Analysis for carbon, hydrogen, and nitrogen checked well for the composition $C_{16}H_{11}O_2N \cdot C_7H_4O_7N_2$, mol. wt. 477.

EXAMPLE 8

*8-quinolinyl benzoate-3,5-diiodosalicylic acid salt*

7.8 gms. (0.02 mole) 3,5-diiodosalicylic acid were dissolved in 400 ml. boiling benzene. To this were added 4.58 gms. (0.02 mole) 8-quinolinyl benzoate. A clear solution resulted which on slow cooling gave rise to colorless needles. After 12 hours' standing the product was removed by suction filtration, washed with benzene and air-dried. Yield 7.0 gms. A second crop of colorless flat needles weighing 3.0 gms. was obtained by concentration of the above filtrate. For analysis a sample was recrystallized from benzene, M.P. 175.0–175.5° C. (Anschütz therm.). Carbon, hydrogen, and iodine values were in good agreement for $C_{16}H_{11}O_2N \cdot C_7H_4O_3I_2$, mol. wt. 639.

EXAMPLE 9

*8-quinolinyl benzoate-3-phenylsalicylic acid salt*

5.0 gms. (0.02 mole) 8-quinolinyl benzoate and 4.3 gms. (0.02 mole) 3-phenylsalicylic acid were dissolved in 65 ml. boiling 99% isopropyl alcohol to give a complete solution. Large, colorless prisms resulted on cooling. These were removed by suction-filtration, washed with 99% isopropyl alcohol and air-dried. The yield was 8.2 gms. A 1-gram sample was recrystallized from 10 ml. 99% isopropyl alcohol, giving large prisms, M.P. 149–150° C. (Anschütz therm.). Carbon, hydrogen, and nitrogen values agreed for the composition $$C_{16}H_{11}O_2N \cdot C_{13}H_{10}O_3$$

mol. wt. 463.

EXAMPLE 10

*Di-8-quinolinyl phthalate-di-3,5-diiodosalicylic acid salt*

7.8 gms. (0.02 mole) 3,5-diiodosalicylic acid were first dissolved in 400 ml. boiling benzene. To the resulting clear solution there were added 4.2 gms. (0.01 mole) di-8-quinolinyl phthalate. The clear, pale yellow solution was cooled, a white crystalline precipitate being obtained and removed using suction filtration, followed by benzene washing and air-drying. This yielded 10.2 gms. of product and recrystallization from benzene yielded colorless needles, M.P. 179.2–180.8° C. (Anschütz therm.). Analysis for carbon, hydrogen, iodine agreed for the composition $C_{26}H_{16}O_4N_2 \cdot 2C_7H_4O_3I_2$, mol. wt. 1189.6.

EXAMPLE 11

*8-quinolinyl cinnamate-3,5-diiodosalicylic acid salt*

5.52 gms. 8-quinolinyl cinnamate were added to a boiling solution of 7.8 gms. 3,5-diiodosalicylic acid in 400 ml. benzene. The solution was filtered to remove a small amount of brownish impurity. On cooling a colorless product resulted. This was isolated as described previously to give 3.5 gms. of product. A recrystallized sample (from benzene) had a melting point of 144.5–146° C. (Anschütz therm.) and analyzed correctly (carbon, hydrogen and iodine) for $C_{18}H_{13}O_2N \cdot C_7H_4O_3I_2$, molecular weight 664.8.

EXAMPLE 12

*8-quinolinyl phenylacetate-3,5-dinitrosalicylic acid salt*

4.2 gms. (0.02 mole) 8-quinolinyl phenylacetate were dissolved in 150 ml. 99% isopropyl alcohol at the boiling point. To this there was added a solution of 4.9 gms. (0.02 mole) 3,5-dinitrosalicylic acid in 50 ml. 99% isopropyl alcohol. Rapid precipitation of a yellow solid resulted. After cooling to room temperature the product was filtered, washed with 99% isopropyl alcohol and air-dried. The yield was 7.2 gms. Recrystallization from dioxane gave flat orange plates, M.P. 240–241° C. (Anschütz therm.) to a red liquid. Analysis was correct for the composition $C_{17}H_{13}O_2N \cdot C_7H_4O_7N_2$, molecular weight 491, based on carbon, hydrogen, and nitrogen determinations.

EXAMPLE 13

*8-quinolinyl butyrate-3,5-dinitrosalicylic acid salt*

2.46 gms. (0.02 mole) 3,5-dinitrosalicylic acid were dissolved in 25 ml. 99% isopropyl alcohol followed by 2.15 gms. (0.02 mole) of 8-quinolinyl butyrate. A clear solution resulted, and a yellow product precipitated shortly after mixing. A total of 4.4 gms. was thereby recovered which after recrystallization from dioxane gave fine yellow needles, melting point 172–172.5° C. (Anschütz therm.) and easily distinguishable from 3,5-dinitrosalicylic acid by its poor water solubility. This product analyzed in close agreement for $C_{13}H_{13}O_2N \cdot C_7H_4O_7N_2$, molecular weight 443.

EXAMPLE 14

*8-lauroyloxyquinoline-3,5-diiodosalicylic acid salt*

3.27 g. (0.01 mole) 8-lauroyloxyquinoline (mol. wt. 327) was dissolved in 50 ml. of boiling benzene. To this there was added a solution of 3.9 g. (0.01 mole) 3,5-diiodosalicylic acid in 200 ml. hot benzene. The two solutions were mixed hot to give a clear amber solution which cooled slowly and gave rise to a small amount of yellowish amorphous precipitate. This was suction filtered, benzene washed, and air-dried 0.8 g.

The filtrate and wash were evaporated in vacuum to 50 ml. The resultant precipitate was suction-filtered, washed with a small amount of benzene followed by acetone in which 3,5-diiodosalicylic acid is extremely soluble. 4.4 g. of colorless solid (M.P. 113–114°) was obtained. A sample was recrystallized from benzene, using 1 g./5 ml., M.P. 117.8–118.3° (Anschütz thermometer). Carbon, hydrogen, and iodine analyses checked for the composition, $C_{21}H_{29}O_2N.C_7H_4O_3I_2$, mol. wt. 716.8.

EXAMPLE 15

*8-quinolinyl benzoate-5-chlorosalicylic acid salt*

10.0 gms. 8-quinolinyl benzoate were dissolved in 100 ml. 99% isopropyl alcohol at the boiling point. To this were added 7.0 g. 5-chlorosalicylic acid; on stirring a clear dark brown solution resulted. This was treated with a small amount of decolorizing charcoal, filtered and cooled. A colorless product was thereby obtained, 11.0 gms. This was recrystallized from 80 ml. benzene, M.P. 137–139° C. (Anschütz therm.). Carbon, hydrogen, nitrogen, and chlorine analyses confirmed the composition, $C_{16}H_{11}O_2N.C_7H_5O_3Cl$, molecular weight 421.5.

EXAMPLE 16

*8-quinolinyl benzoate-4-methyl salicylic acid salt*

10.0 gms. 8-quinolinyl bonzoate were dissolved in 100 ml. 99% isopropyl alcohol at the boiling point. 6.1 gms. 4-methyl salicylic acid were then added. The resultant solution, light amber in color, gave rise to colorless crystals on cooling. 9.0 gms. of product were thus obtained; this was recrystallized from 80 ml. of benzene to yield colorless crystals, M.P. 135.5–136.5° C. (Anschütz therm.). Carbon, hydrogen, and nitrogen analyses checked for the composition, $C_{16}H_{11}O_2N.C_8H_8O_3$, molecular weight 401.

EXAMPLE 17

*Di-8-quinolinyl phthalate-di-4-methyl salicylic acid salt*

10 gms. di-8-quinolinyl phthalate and 7.16 gms. 4-methyl salicylic acid were dissolved with heat in 150 ml. benzene. The resultant light amber solution gave large, colorless crystals on cooling. 14.7 gms. of product were thus obtained. Recrystallization of a sample (2.0 g./20 ml. benzene) gave large, colorless plates, M.P. 151.0–152.0° C. (Anschütz therm.). Carbon, hydrogen, and nitrogen values checked well for $C_{26}H_{16}O_4N_2.2C_8H_8O_3$, molecular weight 724.

EXAMPLE 18

*5-chloro-7-iodo-8-benzoyloxyquinoline, 3,5-diiodosalicyclic acid salt*

(a) *5-chloro-7-iodo-8-benzoyloxyquinoline.*—140.0 g. (0.458 mole) 5-chloro-7-iodo-8-hydroxyquinoline was added to 1400 ml. (17.37 moles) pyridine at 25° C. to form a clear dark red solution. The solution is cooled down to +10° C., and 140.0 g. (1.0 mole) benzoyl chloride is added at the rate of 1 ml./minute over a period of 2 hrs. in the temperature range +10 to +15° C. Agitation is continued for 1½ hrs. after all benzoyl chloride has been added. The pyridine solution is then added to 4½ liters of tap water, with agitation. A light green oil deposits on the beaker wall, which forms a white solid when scratched. Agitation is continued for 1 hour. The white solid must be scratched off the beaker walls before excess hardening occurs. The product was filtered off and washed with three liters of tap water to remove any pyridine. It was then slurried in 500 ml. Solox, to remove any benzoic acid. A turbid milky filtrate forms which becomes a clear light green solution after final alcohol washing. The sample was dried by house-vacuum and then by air. The yield was 140.0 g.

90 g. of the above yield was then dissolved in 1440 ml. 99% isopropanol. 3.0 g. Darco was added to the boiling solution and stirred while boiling for 5 minutes. The Darco was removed by suction-filtration through a Hyflo-bed, and the clear light green-amber filtrate gave rise to 62.0 g. light green grain-like crystals.

(b) *3,5-diiodosalicyclic acid salt.*—5.0 gms. 5-chloro-7-iodo-8-benzoyloxyquinoline were dissolved in a boiling solution of 5 ml. benzene and 15 ml. 99% isopropyl alcohol. There were then added 4.8 gms. of 3,5-diiodosalicylic acid. On slow cooling slightly green colored crystals were obtained in a yield of 6.6 gms. A sample was recrystallized twice for analysis from the same 3:1 isopropyl alcohol:benzene solution to give practically colorless crystals, M.P. 171–173° C. with prior softening at 168° C. (Anschütz therm.). This analyzed correctly for carbon, hydrogen, nitrogen, chlorine and iodine for the composition, $C_{16}H_9O_2NICl.C_7H_4O_3I_2$, molecular weight 799.3.

EXAMPLE 19

*5,7 - dibromo - 8-benzoyloxyquinoline-3,5-diiodosalicylic acid salt*

(a) *5,7 - dibromo - 8 - benzoyloxyquinoline.*—20.0 g. (0.066 mole) 5,7-dibromo-8-hydroxyquinoline was added to 250.0 ml. (3.1 moles) pyridine at 25° C. The clear light yellow solution was cooled down to +10° C., and 12.0 g. (0.85 mole) benzoyl chloride was added at the rate of 1 ml./12 minutes over a period of 2 hours, in the temperature range +10 to +15° C. Agitation was continued for 2 hours after final addition of benzoyl chloride. The pyridine solution was then slowly poured into 1500 ml. of tap water, with agitation. Crystallization occurred and within 2–6 minutes a white solid deposited on the beaker wall. After 10 minutes the solid was scratched off the beaker wall. Agitation was continued for 1 hour longer. The product was filtered off with suction and all pyridine washed out with 1½ liters of tap water. The residue was slurried in 100 ml. accasolve to remove any excess benzoic acid. The solid was filtered off again, with suction, and washed with accasolve. The air dried yield was 21.35 g.

The crude ester was then dissolved in 575.0 ml. of 99% i-propanol. The hot clear light amber solution was allowed to cool slowly to give rise to clusters of prismatic white crystals. They were suction-filtered and washed with additional 99% i-propanol. Yield was 18.6 g. One gram was taken and recrystallized twice from 99% i-propanol for analysis: M.P.=147.0–148.0° (Anschütz thermometer). Analysis for carbon, hydrogen, nitrogen, and bromine agreed with the theoretical $C_{16}H_9O_2NBr_2$; molecular wt. was 407.060.

(b) *3,5-diiodosalicylic acid salt.*—3.0 gms. of 5,7-dibromo-8-benzoyloxyquinoline were dissolved in 30 ml. of benzene to give a colorless solution. To this hot solution were added 2.88 gms. 3,5-diiodosalicylic acid. An additional 65 ml. of benzene were required to cause complete solution. On slow cooling, fine colorless crystals were obtained in a yield of 4.0 gms. after suction filtration, washing with a small amount (10 ml.) of benzene, and air-drying. After recrystallization from benzene (1 g./20 ml.) the melting point was 188–189° (to a red liquid with softening at 187.5° C. (Anschütz therm.)). The product, on analysis for carbon, hydrogen, nitrogen, bromine, and iodine proved to be of the composition $C_{16}H_9O_2NBr_2.C_7H_4O_3I_2$, molecular weight 797.

EXAMPLE 20

*5,7 - diiodo - 8 - benzoyloxyquinoline-3,5-dinitrosalicylic acid salt*

(a) *5,7 - diiodo - 8 - benzoyloxyquinoline.*—140.0 g. (0.353 mole) 5,7-diiodo-8-hydroxyquinoline was added to 1400 ml. (17.37 moles) pyridine at 25° C. to form a clear dark red solution. The solution was cooled down to +10° C., and 140.0 g. (1.0 mole) benzoyl chloride was added at the rate of 1 ml./minute over a period of 2 hours in the temperature range +10 to +15° C. Agitation was continued for 2 hours following final addition of benzoyl chloride.

The pyridine solution was then worked up in two halves. Each half was poured into 6 liters of tap water and agitated for 1 hour. Within 3–6 minutes, a light olive green oil deposited on beaker walls and solidified slowly. The light olive green ppt. was scratched off the walls before excess hardening occurred. The product was filtered off with suction and washed free of pyridine with 2 liters of tap water. The filtrate was a light clear green. The amorphous light green solid was then slurried in 250 ml. accasolve, refiltered, and washed with two 50 ml. portions of accasolve. The air dried yield was 149.0 g.

60.0 g. were dissolved in a boiling solution of 300 ml. benzene and 300 ml. 99% i-propanol (1:1) to an amber solution. 2.0 g. Darco were then added and the boiling solution stirred for 5 minutes and filtered by suction through a Hyflo-bed.

The hot filtrate was a lighter amber than before the addition of Darco. 38.8 g. of light green crystals formed. 5.0 g. of this product was then recrystallized twice from 1:1 solutions of benzene and 99% i-propanol and sent in for analysis; M.P.=167.0–168.5° C. (Anschütz therm.). Analysis for carbon, hydrogen, nitrogen, and iodine agreed with the theoretical $C_{16}H_9O_2NI_2$; molecular weight is 500.8.

(b) *3,5-dinitrosalicylic acid salt.*—3.0 g. (0.006 mole) 5,7-diiodo-8-benzoyloxquinoline was dissolved in 30 ml. of boiling 1:1 solution of 99% isopropanol and benzene. To this was added 1.35 g. (.006 mole) 3,5-dinitrosalicyclic acid. A clear light amber solution resulted which, on rapid cooling and scratching with a glass stirring rod, gave rise to yellow crystals. After standing overnight, the product was removed by suction-filtration, washed with 1:1 99% isopropanol-benzene solution and air dried. Yield 2.60 g. A 0.7 gram sample was recrystallized from 25 ml. benzene for analysis; M.P. 152–153° C. (Anschütz). Carbon, hydrogen, nitrogen, and iodine values were in good agreement for $C_{16}H_9NO_2I_2 \cdot C_7H_4N_2O_7$, mol. wt. 729.2.

EXAMPLE 21

*5,7-dibromo-8-benzoyloxyquinoline-3,5-dinitrosalicyclic acid salt*

5.0 g. (0.012 mole) 5,7-dibromo-8-benzoyloxyquinoline, prepared as in Example 13, were dissolved in 120 ml. boiling benzene. To this was added 2.7 g. (0.012 mole) 3,5-dinitrosalicyclic acid. A clear, light amber solution resulted which, on removal from heat, rapidly crystallized out light yellow needles. After standing one hour, the product was removed by suction-filtration, washed with benzene and air-dried. Yield 6.0 g. A 5.0 g. sample was recrystallized from 80 ml. benzene for analysis, M.P. 173–174° C. (Anschütz). Carbon, hydrogen, nitrogen and bromine values were in excellent agreement for $C_{16}H_9NBr_2O_2 \cdot C_7H_4N_2O_7$, mol. wt. 635.18.

EXAMPLE 22

*5-chloro-7-iodo-8-benzoyloxyquinoline-5-chloro-salicylic acid salt*

4.92 g. (0.12 mole) 5-chloro-7-iodo-8-benzoyloxyquinoline were dissolved in a boiling solution of 21 ml. benzene and 7 ml. 99% isopropanol, yielding an amber solution. 5.0 g. (0.29 mole) 5-chloro salicyclic acid were separately dissolved in 100 ml. boiling benzene. 2.0 g. Darco were added to the dark purple solution and stirred while boiling for 5 minutes. Filtration by suction through Hyflo gave a colorless filtrate from which 2.1 g. of white needles crystallized out; M.P.=175–176° C. To the hot amber solution, 2.07 g. (0.12 mole) of the decolorized 5-chloro-salicylic acid were added and the solution was stirred for 5 minutes. The resulting amber solution was allowed to cool slowly and some scratching was used to induce crystallization. White crystals formed; they were suction-filtered and washed with a 3:1 ratio of benzene to 99% isopropanol. The air-dried yield was 2.0 g. The product was twice recrystallized from straight benzene. M.P. 161.0–164.0° C. (Anschütz thermometer). Analysis for carbon, hydrogen, nitrogen, chlorine, and iodine agreed with the theoretical $$C_{16}H_9O_2NClI \cdot C_7H_5O_3Cl$$

molecular weight is 582.184.

EXAMPLE 23

*5,7-diiodo-8-benzoyloxyquinoline-5-chloro-salicylic acid salt*

3.0 g. (0.006 mole) 5,7-diiodo-8-benzoyloxquinoline (prepared as in Example 20) was dissolved in 15.0 ml. boiling benzene. To the hot light green solution, 1.02 g. (0.006 mole) 5-chloro-salicylic acid was added. The solution became an opaque dark purple, but was homogeneous. 1.0 g. Darco was added and the solution was agitated 5 minutes before filtering it, with suction, through a Hyflo-bed. 15.0 ml. of petroleum ether (30–60°) were added to the hot light yellow filtrate, and stirred into solution. The solution was allowed to cool slowly. 2.8 g. of fine white crystals were obtained, and were washed with two 10.0 ml. portions of 1:1 benzene and petroleum ether (30–60°). The product was recrystallized twice with 20.0 ml. of 1:1 solution of benzene and petroleum ether (30–60°) to obtain a 0.83 g. yield. 0.33 g. of this was recrystallized once again with an 87 mg. yield; M.P. 146.8–147.2° C. (Anschütz thermometer). Analysis for carbon, hydrogen, nitrogen, chlorine, and iodine agreed with the theoretical values for $$C_{16}H_9O_2NI_2 \cdot C_7H_5O_3Cl$$

molecular weight 673.677.

EXAMPLE 24

*5,7-dibromo-8-benzoyloxyquinoline-5-chloro-salicylic acid salt*

2.9 g. (0.007 mole) 5,7-dibromo-8-benzoyloxyquinoline (prepared as in Example 19) were dissolved in 20.0 ml. boiling benzene. To the hot colorless solution, 1.2 g. (0.007 mole) 5-chloro-salicylic acid was added. The solution became opaque dark purple, but was homogeneous. 0.5 g. Darco was added and the solution was agitated 5 minutes before filtering it, with suction through a Hyflo-bed. The hot amber filtrate was allowed to cool slowly. White crystals were obtained; the 1.8 g. yield was washed with two 10.0 ml. portions of benzene and air dried. The 1.8 g. yield was recrystallized twice more with benzene without using Darco. The final yield was 0.35 g.; M.P. 159.4–160.2° C. (Anschütz thermometer). Analysis for carbon, hydrogen, nitrogen, bromine, and chlorine agreed with the theoretical values for $C_{16}H_9O_2NBr_2 \cdot C_7H_5O_3Cl$; molecular weight is 579.631.

EXAMPLE 25

*8-para-nitrobenzoyloxyquinoline-salicylic acid salt*

(a) *8-para-nitrobenzoyloxyquinoline.*—To 14.5 g. of 8-hydroxyquinoline dissolved in 250 ml. of pyridine at room temperature, were added 26.8 g. para-nitrobenzoyl chloride. The resulting clear, light-amber solution was then heated on a steam bath with agitation for 45 minutes. The clear, dark-amber solution was cooled to 25° C. and slowly poured into 3 liters of tap water while agitating, which yielded a white precipitate. After 1½ hrs. of agitation, the precipitate was filtered off, washed with $H_2O$, then washed with 0.5 N HCl solution followed by 2 liters of water. The precipitate was then slurried in 600 ml. methanol to remove any excess paranitrobenzoic acid, filtered and air dried. A tan-colored solid was obtained; yield 27.0 g.

A sample of the 27.0 g. of precipitate was recrystallized twice from hot benzene giving light amber, needle-like crystals (M.P. 173–173.5° C.) which corresponded to the formula $C_{16}H_{10}N_2O_4$ on elemental analysis for carbon, hydrogen and nitrogen.

(b) *Salicylic acid salt.*—To 5.0 g. of 8-para-nitrobenzoyloxyquinoline dissolved in 100 ml. of hot benzene were added 2.1 g. of salicylic acid. From the resulting clear, light-amber solution there slowly crystallized large, light green-amber crystals on standing (yield 6.4 g.) 2.0 g. of product were twice recrystallized to give very light green-amber tinted crystals (yield 1.0 g., M.P. 160–161.5° C.) which proves to be $C_{16}H_{10}N_2O_4 \cdot C_7H_6O_3$ on elemental analysis for C, H and N.

As already indicated, the salts of the present invention have been found to be highly effective in the treatment of various fungal infections. Although 8-hydroxyquinoline itself and its known salts have been found to be active in the control of the growth of microorganisms, beneficial results therewith in the treatment of fungal infections, e.g., dermatophytosis pedis, require relatively high concentrations. Moreover, the use of these substances has resulted in irritation reactions observed clinically. A study was made to determine the cause of such irritations (R. Van Winkle and W. G. Christiansen, J. Am. Pharm. Assoc., vol. 18, p. 794–796 (1929)), and it was demonstrated that the changing of the acid molecule of 8-hydroxyquinoline salts had very little effect on the antiseptic action of the latter. Also, no definite relation was found to exist between irritations which resulted from the therapeutic use of these salts and the pH variation caused by the different acid molecules attached to the quinoline nucleus. The authors concluded that "the irritation is in all probability a factor of the 8-hydroxyquinoline nucleus itself rather than a factor of the pH of the aqueous solution caused by the acid molecule attached to it."

My new ester-salts, on the other hand, suppress the irritating action of the 8-hydroxyquinoline moiety while apparently synergizing its antifungal properties with the salicyclic acid which itself possesses no such properties. The new compounds have been found in clinical tests to be useful particularly in the treatment of dermatophytosis pedis ("athlete's foot"), which is caused by a group of microorganisms among which are commonly found *Tricophyton mentagrophytes, Tricophyton gypseum, Tricophyton rubrum,* and *Epidermophyton floccosum.* My improved compounds are active also against *Tricophyton tonsurans* (which causes "barber's itch"), *Microsporum audouini, Microsporum canis,* and *Microsporum fulvum,* and also against *Candida albicans,* whose growth frequently results from the use of antibiotics which destroy the bacteria which normally hold this fungus in check.

One technique used to evaluate the effectiveness of the products of this invention against the above-named and other organisms causing superficial or topical infections is based upon the classical test procedures evolved by K. A. Oster and M. J. Golden (J. Am. Pharm. Assoc., XXXvi, 359–362 (1947); ibid., p. 283–288). Essentially, the method consists in treating 20 mm. discs of the 14-day old culture of the test organism with the medication at pre-determined concentrations. After set periods of exposure to the medication, the discs are washed free of the latter, using suitable solvents, and are then placed face down on agar slants and incubated at 28–30° C. for 3 weeks. The test organisms employed by me were *T. mentagrophytes, E. floccosum* and *T. gypseum* of the American Type Culture Collection. Strains of these organisms isolated from infected areas of humans were also employed. For test purposes and illustrative of one of the products, the salicyclic acid salt of 8-quinolinyl benzoate was employed in in various formulations, as follows:

I. OINTMENT-HYDROPHLLIC 0.512 gm. 8-quinolinyl benzoate-salicyclic acid salt (8-benzoyloxyquinoline salicylate) was added to a warm solution of 10 gms. dipropylene glycol in 10 gms. of polyethylene glycol ("Carbowax," molecular weight 1000). On agitation a clear solution resulted. Cooling to room temperature gave an ointment of good consistency of the following composition:

| Component: | Percent by weight |
|---|---|
| 8-quinolinyl benzoate-salicyclic acid salt | 2.5 |
| Dipropylene glycol | 48.75 |
| Polyethylene glycol 1,000 | 48.75 |

II. SOLUTION

A 1:100 stock solution of 8-benzoyloxyquinoline salicylate in dipropylene glycol was used for further dilution with Saboraud malt agar.

III. AEROSOL

An aerosol formulation was prepared of the following composition:

| Ingredient: | Percent by weight |
|---|---|
| Benzoyloxyquinoline salicylate | 0.25 |
| Dipropylene glycol | 10.00 |
| Genetron 11/12 (1:1) [1] | 89.75 |

[1] Genetron 11/12 (1:1) is a product of the General Chem. Div., Allied Chem. & Dye Corp., and consists of a mixture of equal parts by weight of trichlorofluoromethane (Genetron 11) and dichlorodifluoromethane (Genetron 12).

All tests were run in duplicate.

(1) Typical test data for the hydrophyllic ointment are as follows:

| Organism | Growth After 15 Minutes' Exposure to Ointment | Growth After 15 Minutes' Exposure to Control [1] |
|---|---|---|
| T. mentagrophytes | – – | +++ +++ |
| T. gypseum | – – | +++ +++ |
| E. floccosum | – – | +++ +++ |

[1] Control=ointment base without medicament.
– =no growth; +=growth; ++=mild growth; +++=very heavy growth.

This series of tests demonstrated the excellent fungicidal properties of the salt contained in the ointment.

(2) The solution was tested to determine the fungistatic activity in the presence of protein. The method employed was the medicated agar slant technique, the agar containing 10% horse serum as the protein. The stock solution (1:100) of 8-benzoyloxy quinoline salicylate in dipropylene glycol was diluted to the noted concentrations with Saboraud malt agar and added to the tubes containing the agar nutrient to give the final concentrations listed below. The tubes were then inoculated with spore suspensions of the various test organisms and then incubated for 3 weeks at 28–30° C.

Organisms:
(1) *Epidermophyton floccosum*—ATCC No. 10227
(2) *Tricophyton mentagrophytes*—ATCC No. 9533
(3) *Tricophyton gypseum*—V–1 Dr. H. Glick Results

| Organism | Concentration | | | | |
|---|---|---|---|---|---|
| | 1:1,000 | 1:10,000 | 1:50,000 | 1:100,000 | 1:500,000 |
| E. floccosum | – – | – – | – – | + + | + + |
| T. mentagrophytes | – – | – – | – + | + + | + + |
| T. gypseum | – – | – – | – + | + + | + + |

Control tubes showed very heavy growth=+++.

This series demonstrates the high fungistatic activity of 8-benzoyloxyquinoline salicylate, such activity being marked even at 1:50,000 in the presence of horse serum. This order of activity is at least three-fold that of the parent compound, 8-hydroxyquinoline.

(3) The aerosol formulation was tested similarly to the ointment. The discs which were covered by a 14-day old culture of the test organisms were lightly sprayed with the aerosol, allowed to stand for the time intervals indicated below, washed free of medication and then placed down on the agar slants, followed by 3 weeks' incubation at 28–30° C.

oxyquinoline salicylate in dipropylene glycol (equivalent to 150 mg. of the test compound) per kg. of body weight were applied to the depilated intact and abraded skin areas. Skin contact with the solution was maintained for 6 hours per day, 5 days a week, for a three-week period, and the animals were observed for two additional weeks. The concentration of test material used was equivalent to that in the residual solution after evaporation of the aerosol propellant. At the end of each day the excess material was wiped off with absorbent cotton. The condition of the skin was examined prior to each succeeding application. Following the final treatment,

| Organism | Time of Exposure To Medication | | | | | | | |
|---|---|---|---|---|---|---|---|---|
| | 2 min. | 5 min. | 10 min. | 15 min. | 30 min. | 1 hr. | 2 hrs. | 4 hrs. |
| T. mentagrophytes | - - | - - | - - | - - | - - | - - | - - | - - |
| T. gypseum | - - | - - | - - | - - | - - | - - | - - | - - |
| E. floccosum | - - | - - | - - | - - | - - | - - | - - | - - |
| [1] Control | + + | | | + + | | + + | | + + |

[1] Control was the aerosol formulation, i.e., propellants and solvent but no medicament.

The results of this test indicate that the aerosol formulation is the most effective preparation in terms of fungicidal action and medicament concentration. A comparison of this product with the more outstanding preparations already in commercial use indicates it to be vastly superior to the latter.

Similar results are obtained with preparations containing 8-quinolinyl benzoate 3,5-diiodosalicylate and suitable especially for the treatment of skin infections.

I. OINTMENT-HYDROPHYLLIC 1.43 grams 8-quinolinyl benzoate-3,5-diiodosalicylic acid salt (8 - benzoyloxyquinoline - 3,5 - diiodosalicylate) were added to a warm solution of 25 grams dipropylene glycol in 25 grams of polyethylene glycol ("Carbowax," molecular weight 1000). On agitation, a clear solution results. Cooling to room temperature gave an ointment of good consistency of the following composition:

Component: Percent by weight
8 - benzoyloxyquinoline-3,5-diiodosalicylic acid salt _____ 2.8
Dipropylene glycol _____ 48.6
Polyethylene glycol 1,000 _____ 48.6

II. SOLUTION

8-Benzoyloxyqinoline-3,5-dinitrosalicylate ____ 1.0
Dipropylene glycol _____ 99.0

III. AEROSOL

An aerosol formulation was prepared of the following composition:

Ingredient: Percent by weight
8-benzoyloxyquinoline 3,5-diiodosalicylate ___ 0.75
Dipropylene glycol _____ 10.00
Genetron 11/12 (1:1) _____ 89.25

*Animal and clinical tests*

By way of example, tests conducted on animals and on human beings with the at present preferred compound, 8-benzoyloxyquinoline salicylate, will now be described.

Primary irritation tests conducted on rabbits with a solution of 8-benzoyloxyquinoline salicylate have shown that even when applied at a dose as high as 150 mg. (as a 2.5% solution in dipropylene glycol) per kg. body weight per day, the salt is not a primary irritant to the skin of the animals. The tests were made on depilated intact skin and also on depilated abraded skin areas of six healthy, young, adult rabbits, and scores were assigned for the degrees of edema and erythema which developed, a system described by Draize being employed (Draize, Food Drug Cosmetic Law Journal, 10, 722 (1955)).

During this test, 6 ml. of a 2.5% solution of 8-benzoylthe animals were observed for two weeks for possible latent effects.

All rabbits survived and gained weight during the test period. The behavior and appearance of the animals as well as the condition of their skin remained essentially normal throughout the test period, and no edema or erythema was noted.

The aerosol preparation described above was tested also on a group of 200 white adult men and women who were subjected to patch tests to determine whether the preparation was capable of producing an immediate or primary irritation of the skin. The solution was impregnated into ½-inch squares of clean white blotting paper which was then applied to previously cleansed skin sites and covered with an "Elasto-patch" plaster and allowed to remain in contact with the skin for 48 hours. Upon removal of the patches, the test areas were observed at once for immediate reactions and again in 15 minutes for "immediate delayed" reactions.

The results of the tests showed that of the 200 subjects, 194 were negative reactors, while only 3 showed definite erythema and 3 showed a minimal reaction. These tests established that the preparation was not a primary irritant.

One hundred white adult men and women, who had reacted negatively in the just-described primary irritation tests, were then subjected to repeated "insult" patch tests according to the method of Draize as modified by Shelanski and Shelanski, in order to determine whether the test sample was capable of inducing allergenic sensitization of the skin (Shelanski, H. A. and Shelanski, M. V., Proc. of Toilet Goods Assn. No. 19 (1953)). In this test, the test site at any particular time was thoroughly cleansed with 70% isopropyl alcohol, the test sites including the upper back, shoulder, forearm, and other areas. The material to be tested was then impregnated into ½-inch squares of clean white blotting paper, applied to the previously cleansed skin sites, covered with an "Elasto-patch" plaster and allowed to remain in contact with the skin for 48 hours. Upon removal of the patches, the test areas were observed at once for immediate reaction and again in 15 minutes for "immediate delayed" reaction. Then a new sample of the test material was applied to different test sites and the subject instructed to return in 48 hours. This was repeated until 6 applications had been made.

The results of the tests showed that all 100 subjects could be classified as negative reactors to the first five insults. On the sixth insult, 95 were classified as negative reactors, 2 showed definite erythema, and 3 showed a minimal reaction. None showed erythema with edema or vesiculation with edema. This applied also to the previous tests. These tests showed that there was no allergenic or sensitizing reaction to the aerosol lotion.

The above-described aerosol preparation was employed in the treatment of 25 patients with clinical tinea pedis, which was established in all cases by culture on Saburaud's media. The organisms involved were as follows:

*T. gypseum*, 10 cases; *E. inguinale*, 8 cases; *T. purpureum* (Rubrum), 5 cases; *Candida albicans*, 2 cases.

All of the cases were on glabrous skin. The 18 cases of *T. gypseum* and *E. inguinale* all responded extremely well clinically to the aerosol spray within a two-week period. Itching between toes ceased completely within 48 hours, and healing of the dry, scaly patches was apparent after 96 hours. In two of the cases the aerosol preparation was found to be irritating, but these involved acute vesicular type eruptions. After treatment with the aerosol preparation was temporarily stopped, the patients were given cool compresses, and after the inflammation had subsided, the aerosol preparation was again applied with no harmful effects, and the response to the therapy was found to be excellent.

On the five *T. purpureum* cases, four responded excellently. The one case that failed to respond also gave no response to treatment with other antifugal agents. The two *C. albicans* cases responded within 48 hours.

The application of the salicylate salt by way of an aerosol preparation was found to be extremely convenient and was very well accepted by the patients because of the absence of messiness.

Other compounds of the present invention have shown similar activities to varying degrees. A very high order of activity has been exhibited by the 3-phenylsalicylic acid salt of 8-benzoyloxyquinoline, especially against *T. mentograpytes* and *T. gypseum*. It has been outstanding against the pseudomonads, the bacterial contaminants responsible for the degradation of cutting oil emulsions, and has been successfully tested by addition to cutting oils.

Industrial applications

The effective making of the phenolic properties of the 8-hydroxyquinoline nucleus together with increase of its antimicrobial activities has been found to be of advantage also in connection with coating compositions. The obvious assumption that simple esterification is sufficient to remove the phenolic properties of 8-hydroxyquinoline is not valid. The esters of 8-hydroxyquinoline are not sufficiently stable in many applications for their practical utilization. The rapid liberation of 8-hydroxyquinoline occurs under very mild conditions. For example, when 8-benzoyloxyquinoline was added to an alkyl resin paint of the following composition for the purpose of giving the resultant coating mildew-resistant properties, Pigment (61.8%): Percent
  Ti-Ca pigment _____ 68.7
  $TiO_2$ _____ 2.5
  $CaCO_3$ _____ 23.2
  Silica _____ 5.6
Vehicle (38.2%):
  Modified alkyd resin _____ 28.2
  Aliphatic hydrocarbons and driers _____ 71.8 a rapid strong yellowing of the paint occurred shortly on mixing in the ester. Thus, even under anhydrous conditions and room temperature the ester produced a rapid discoloration of the paint identical with the result obtained on adding an equivalent quantity of 8-hydroxyquinoline or its salts.

However, when the salicylic acid salt of 8-benzoyloxyquinoline was added to the same paint under identical conditions, the original whiteness of the paint was preserved. Moreover, when the resultant film, obtained by coating a porous surface of filter paper with the paint containing this product, was tested under accepted procedures, described below, for resistance to the growth of mildew-forming organisms such as *Pullularia pullulans* and *Aspergillus niger*, a high order of activity was found.

The utility of the new products as mildew preventives for paints and other coating and impregnating compositions as illustrated by the following two examples.

In these tests the product was incorporated in the paints by simple mixing. The procedure for testing was based on the method of R. M. Evans and E. G. Bobalek, Industrial and Engineering Chemistry, vol. 48, p 122 (1956). A 1½" x 1½" square of Whatman filter paper was given 2 coats of the test paint, allowing at least 24 hours between coats. The film was allowed to age-dry for 1 week prior to test. The coated squares were then placed on petri dishes containing 25 ml. of nutrient agar over which 1.25 ml. of a spore suspension of *Pullularia pullulans* had been placed. Then 0.25 ml. of the spore suspension was placed directly on the film. The dishes were then placed in an incubator at 28–30° C. at 80–90% humidity for 4 weeks. A 1% by weight concentration of 8-benzoyloxyquinoline salicylate was used in a polyvinyl acetate exterior white paint of commercial manufacture having the following general composition:

Pigment volume concentration _____percent__  39.0
Solids content _____do___  50.3
Weight per gallon _____lbs.___  11.3
Viscosity _____KU___  72–75
pH _____ 8.0–8.5

A similar concentration of 1% by weight was also used in an alkyd resin 1-coat paint for interior use having the following composition, Pigment (61.8%): Percent
  Ti-Ca pigment _____ 68.7
  $TiO_2$ _____ 2.5
  $CaCO_3$ _____ 23.2
  Silica _____ 5.6
Vehicle (38.2%):
  Modified alkyd resin _____ 28.2
  Aliphatic hyrocarbons and driers _____ 71.8

After 4 weeks of incubation, there was no evidence of growth of mold in those petri dishes containing the squares coated with paint containing the mildew-inhibitor. The controls which consisted of the paper squares coated with the paint samples prior to the incorporation of the 8-benzoyloxyquinoline salicylate were completely overgrown by the mold, *Pullularia pullulans*.

It was also noted that no discoloration was present either in the mixed paint which contained the salicylate salt or in the dried films. Other tests showed the fungicide effective even after extensive water leaching of the films and accelerated aging by heating at 65° C. for 24 hours. This is in sharp contrast to 8-hydroxyquinoline and its known salts.

The compounds of the present invention are easily adapted for use as inhibitors of mildew and for control of growth of microorganisms. They are sufficiently soluble in a variety of solvents to permit incorporation in such materials as plastic coatings or films. In aqueous systems these products can be used directly as suspensions or in the form of water-dispersible pastes. These varieties of formulations can be used for the preservation of fabric, leather, wood, hemp, paper, and other materials which are susceptible to degradation by microorganisms. The stability of these new compounds is such as to permit their formulation with other desirable agents such as water-proofing waxes, resins, and flame-proofing chemicals. As previously indicated, these compounds are also suitable for use with other fungistatic agents, e.g., phenylmercury salts or chlorinated phenols. The lack of reaction with these and others, especially exemplified by the absence of color formation, creates applications for difficult problems of growth control of microorganisms frequently encountered in the types of products indicated. The products of the invention are poorly soluble in water and are thus highly resistant to the leaching activity encountered in aqueous systems. However, the order of antimicrobial activity is so high that the concentrations obtainable in water solutions are far beyond that needed for suppressing the growth of microorganisms. Also, the vapor pressures of these products are sufficiently low so that the loss by volatilization is not significant. This is of especial importance for those applications wherein the treated materials, e.g., plastics, are subjected to elevated temperatures in the course of preparation or use. Thus, the manufacture of vinyl sheeting requires elevated temperatures, yet my products have been found to remain intact and fully active after being subjected to such treatment. Thus, exposure for 200 hours at 90° C. of the 8-benzoyloxyquinoline salicylate showed negligible weight loss.

An aerosol preparation of the above-described ester-salts has proved to be a very convenient and efficient means for applying the medicament to infected areas. The medicament can be dissolved or suspended in the volatile carrier, and the mixture is dispensed from a container provided with a nozzle which causes the aerosol preparation to be ejected in the form of a fine spray. It will be evident that the composition of the aerosol carrier is not limited to that disclosed hereinabove, but that any suitable composition which is non-toxic and non-irritating to infected skin areas can be employed.

The concentration of the ester-salts of the present invention in various industrial compositions such as paints and other coating compositions, impregnating media, such as mildew-proofing solutions or suspensions, cutting oils, and other industrial products of more or less liquid nature subject to attack and deterioration by various fungi and bacteria, can be of the order of about 0.1% to about 1%, although somewhat higher concentrations can be used where required.

I claim:

1. A salt of an ester of an 8-hydroxyquinoline and a salicyclic acid, the salicyclic acid being devoid of any substituent having a hydrogen donating potential at least equal to that of the hydroxyl group of such acid, and the ester being of an organic carboxylic acid.

2. A salt of an ester of an 8-hydroxyquinoline of the formula

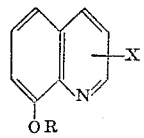

wherein R is an organic carboxylic acyl group and X is a member of the group consisting of hydrogen, lower alkyl, lower alkoxy, and halogen, with a member of the class consisting of unsubstituted salicyclic acid and salicyclic acids substituted in the nucleus by a member of the group consisting of halogen, nitro, lower alkyl, phenyl, and phenylene, the substituted salicyclic acid being devoid of any substituent having a hydrogen donating potential at least equal to that of the hydroxyl group of such acid.

3. A salicylate salt of an organic carboxylic acid ester of a 5,7-dihalogenated-8-hydroxyquinoline, the salicyclic acid being devoid of any substituent having a hydrogen donating potential at least equal to that of the hydroxyl group of such acid.

4. A salicylate salt of an organic carboxylic acid ester of 5,7-diiodo-8-hydroxyquinoline, the salicylic acid being devoid of any substituent having a hydrogen donating potential at least equal to that of the hydroxyl group of such acid.

5. A nuclearly halogenated salicyclic acid salt of an organic carboxylic acid ester of 8-hydroxyquinoline.

6. A 3,5-dinitrosalicylate of an organic carboxylic acid ester of 8-hydroxyquinoline.

7. 8-quinolinyl benzoate 3,5-diiodosalicylate.

8. An antimicrobial preparation comprising a pharmaceutical carrier mixed with an antimicrobial substance consisting essentially of a compound as defined in claim 1.

9. A coating composition consisting essentially of film-forming material and a small quantity, effective as an antifungal agent, of a compound as defined in claim 1.

10. A material subject to microbial attack containing a small but effective quantity of an anti-microbial substance consisting essentially of a compound as defined in claim 1.

11. An aerosol preparation for the treatment of fungal infections comprising a volatile carrier mixed with a compound as defined in claim 1.

12. 5,7-dihalo-8-benzoyloxyquinoline salicylate.

13. A salicylate of a carboxylic organic acid ester of an 8-hydroxyquinoline.

14. A compound of the formula

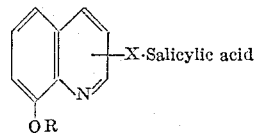

wherein R is the acyl group of an organic carboxylic acid, and X is a member of the group consisting of hydrogen, lower alkyl, and chlorine.

15. A compound as defined in claim 14, wherein X is lower alkyl.

16. 8-benzoyloxyquinoline salicylate.

17. 8-benzoyloxy-4-chloroquinoline salicylate.

18. 8-benzoyloxy-5-chloroquinoline salicylate.

19. Di-8-quinolinylphthalate di-salicylate.

20. A pharmaceutical preparation for the treatment of fungal infections comprising a pharmaceutical carrier mixed with 8-benzoyloxy-quinoline salicylate.

21. A coating composition containing a small quantity, effective as an antifungal agent, of 8-benzoyloxy-quinoline salicylate.

22. A pharmaceutical preparation for the treatment of fungal infections comprising a volatile carrier mixed with a compound as defined in claim 13.

References Cited by the Examiner

UNITED STATES PATENTS 2,411,670  11/1946  Senn _____ 260—289
2,666,058  1/1954  Neher _____ 260—287

OTHER REFERENCES

Grier et al.: J. Org. Chem., vol. 26, pp. 4032–4037, Oct. 24, 1961.

Matsumura, J. Am. Chem. Soc., vol. 52, pp. 4436, (1930).

Nogradi: Ber. Deut. Chem., vol. 85, pp. 104–6 (1952).

Schwartz: "Surface Active Agents and Detergents, vol. II" Interscience 1958, p. 222, Jan. 23, 1958.

Sutton et al.: "Diseases of the Skin," Mosby, 1939, pp. 1078 and 1080 relied on.

Van Winkle, et al.: J. Am. Pharm. Assn., vol. 18, No. 8, pp. 794–796 (1929).

ALEX MAZEL, *Primary Examiner.*

NICHOLAS S. RIZZO, HENRY R. JILES, *Examiners.*

D. M. KERR, D. G. DAUS, *Assistant Examiners.*